US011631055B2

(12) United States Patent
Peres et al.

(10) Patent No.: US 11,631,055 B2
(45) Date of Patent: Apr. 18, 2023

(54) MULTI-TASK DEEP LEARNING OF TIME RECORD EVENTS

(71) Applicant: ADP, INC., Roseland, NJ (US)

(72) Inventors: Wagner Peres, Porto Alegre (BR); Guilherme Gomes, Porto Alegre (BR); Stefan Zanona, Porto Alegre (BR); Roberto Silveira, Porto Alegre (BR)

(73) Assignee: ADP, INC., Roseland, NJ (US)

( * ) Notice: Subject to any disclaimer, the term of this patent is extended or adjusted under 35 U.S.C. 154(b) by 59 days.

(21) Appl. No.: 17/140,892

(22) Filed: Jan. 4, 2021

(65) Prior Publication Data

US 2022/0215347 A1    Jul. 7, 2022

(51) Int. Cl.
*G06Q 10/10*        (2012.01)
*G06Q 10/1091*      (2023.01)
*G06Q 10/04*        (2023.01)
*G06F 17/18*        (2006.01)
*G06N 3/04*         (2023.01)
*G06N 3/08*         (2023.01)

(52) U.S. Cl.
CPC ......... *G06Q 10/1091* (2013.01); *G06F 17/18* (2013.01); *G06N 3/0454* (2013.01); *G06N 3/08* (2013.01); *G06Q 10/04* (2013.01)

(58) Field of Classification Search
None
See application file for complete search history.

(56) References Cited

U.S. PATENT DOCUMENTS

| 2013/0297551 A1* | 11/2013 | Smith ............... G06N 20/00 706/48 |
| 2015/0161553 A1* | 6/2015 | Eggleston ........... H04W 4/021 705/7.15 |
| 2022/0019888 A1* | 1/2022 | Aggarwal ........... G06N 3/0445 |
| 2022/0076506 A1* | 3/2022 | de Matos ............ G07C 1/12 |

\* cited by examiner

*Primary Examiner* — Patricia H Munson
*Assistant Examiner* — Marjorie Pujols-Cruz
(74) *Attorney, Agent, or Firm* — Foley & Lardner LLP (57) ABSTRACT

A method, computer system, and computer program product are provided for managing time record events. Time record events are collected for a number of users. Each time record event includes a geolocation of one of a number of users. The time record events and geolocations for each of the number of users are models via machine learning. A current geolocation for a given user is identified. A suggested event is predicted based on the current geolocation and a current time. The suggested event is pushed to the user.

21 Claims, 8 Drawing Sheets

MULTI-TASK DEEP LEARNING OF TIME RECORD EVENTS

BACKGROUND INFORMATION

1. Field

The present disclosure relates generally to an improved computer system and, in particular, to deep machine learning regarding time record events, as well as predicting and approving future record events.

2. Background

Information management systems may be used for different purposes. For example, a payroll system may be an example of one type of employee information system. A payroll system typically processes payroll to generate paychecks for employees in an organization. A human resources department may use a different type of employee information system to manage employee benefits information and other records about employees. For example, a human resources department may use an employee information system to manage employee health insurance, wellness plans, and other types of employee-based programs and plans.

A timeclock system may be used to track employees' work hours. Current timeclock systems require each employee to login to the system, via a desktop or mobile device, every single day to manually clock in and clock out. This is a low value, repetitive, tedious and uninteresting routine interaction. Furthermore those interactions happens at least twice daily in high volume. During peak hours, clock in and clock out events can cause a sizable impact into the system's infrastructure.

Therefore, it would be desirable to have a method and apparatus for managing time record events that take into account at least some of the issues discussed above, as well as other possible issues. For example, it would be desirable to have a method and apparatus that solve the technical problem of quickly and easily recording time record events in a manner that can save employees time and keep them focused on real valuable activities. Furthermore, it would be desirable to have a method and apparatus that solve the technical problem of reducing the infrastructure impact of the high-volume clock in and clock out operations during peak hours.

SUMMARY

An illustrative embodiment provides a computer-implemented method for recording time record events. The method includes collecting, by a number of processors, time record events for a number of users. Each time record event includes a geolocation of one of the number of users. The method includes simultaneously modeling via machine learning, the time record events and geolocations for each of the number of users. The method includes predicting a timing of suggested events according the modeling. The method includes identifying a current geolocation for a given user during the timing predicted by the modeling. The method includes determining whether the current geolocation of the user matches the suggested geolocation predicted by the modeling. The method includes pushing a suggested event to the given user in response to determining that the current geolocation matches the suggested geolocation.

Another illustrative embodiment provides a system for recording time record events. The system comprises a bus system, a storage device connected to the bus system, wherein the storage device stores program instructions, and a number of processors connected to the bus system, wherein the number of processors execute the program instructions: to collect time record events for a number of users, each time record event including a geolocation of one of the number of users; to model the time record events and geolocations for each of the number of users; to predict a timing of suggested events and suggested geolocation according the modeling; to identify a current geolocation for a given user during the timing predicted by the modeling; to determine whether the current geolocation of the user matches the suggested geolocation predicted by the modeling; and in response to determining that the current geolocation matches the suggested geolocation, to push a suggested event to the given user.

Another illustrative embodiment provides a computer program product for recording time record events. The computer program product comprises a computer readable storage medium having program code stored thereon. The program code includes instructions, stored on the computer-readable storage media, for collecting time record events for a number of users. The program code includes code for collecting time record events for the number of users, each time record event including a geolocation of one of a number of users. The program code includes code for simultaneously modeling the time record events and geolocations for each of the number of users. The program code includes code for predicting a timing of suggested events and suggested geolocation according the modeling. The program code includes code for identifying a current geolocation for a given user during the timing predicted by the modeling. The program code includes code for determining whether the current geolocation of the user matches the suggested geolocation predicted by the modeling. The program code includes code for pushing a suggested event to the given user in response to determining that the current geolocation matches the suggested geolocation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account a timeclock system is often used to track employees' work hours. Current timeclock systems require each employee to manually clock in and clock out by logging into the system via a desktop or mobile device. Furthermore those interactions happens at least twice daily in high volume.

Illustrative embodiments also recognize and take into account that manual clock in and clock out operations are low value, repetitive, tedious and uninteresting routine interaction. During peak hours, clock in and clock out events can cause a sizable impact into the system's performance.

Illustrative embodiments also recognize and take into account that automating clock in and clock out operations can save employees time and keep them focused on real valuable activities, as well as reducing the infrastructure impact of the these operations during peak hours. Based on the historical data of employee behavior for clock in and clock out operations, and artificial intelligence model can be trained to learn and automatically push notifications for clock in/out suggestions. The employee can then easily approve or reject the suggestions, helping to reduce the employees' low value iteration with the timeclock system.

Illustrative embodiments provide a provides a computer-implemented method for recording time record events. Time record events are collected for a number of users. Each time record event includes a geolocation of one of a number of users. The time record events in geolocations for each of the number of users are simultaneously modeling via multimodal multi-task learning. A timing of suggested events and suggested geolocation are predicted according the modeling. A current geolocation for a given user is identified during the timing predicted by the modeling. If the current geolocation matches the suggested geolocation predicted by the modeling, a suggested event is pushed to the user.

Figure 1:
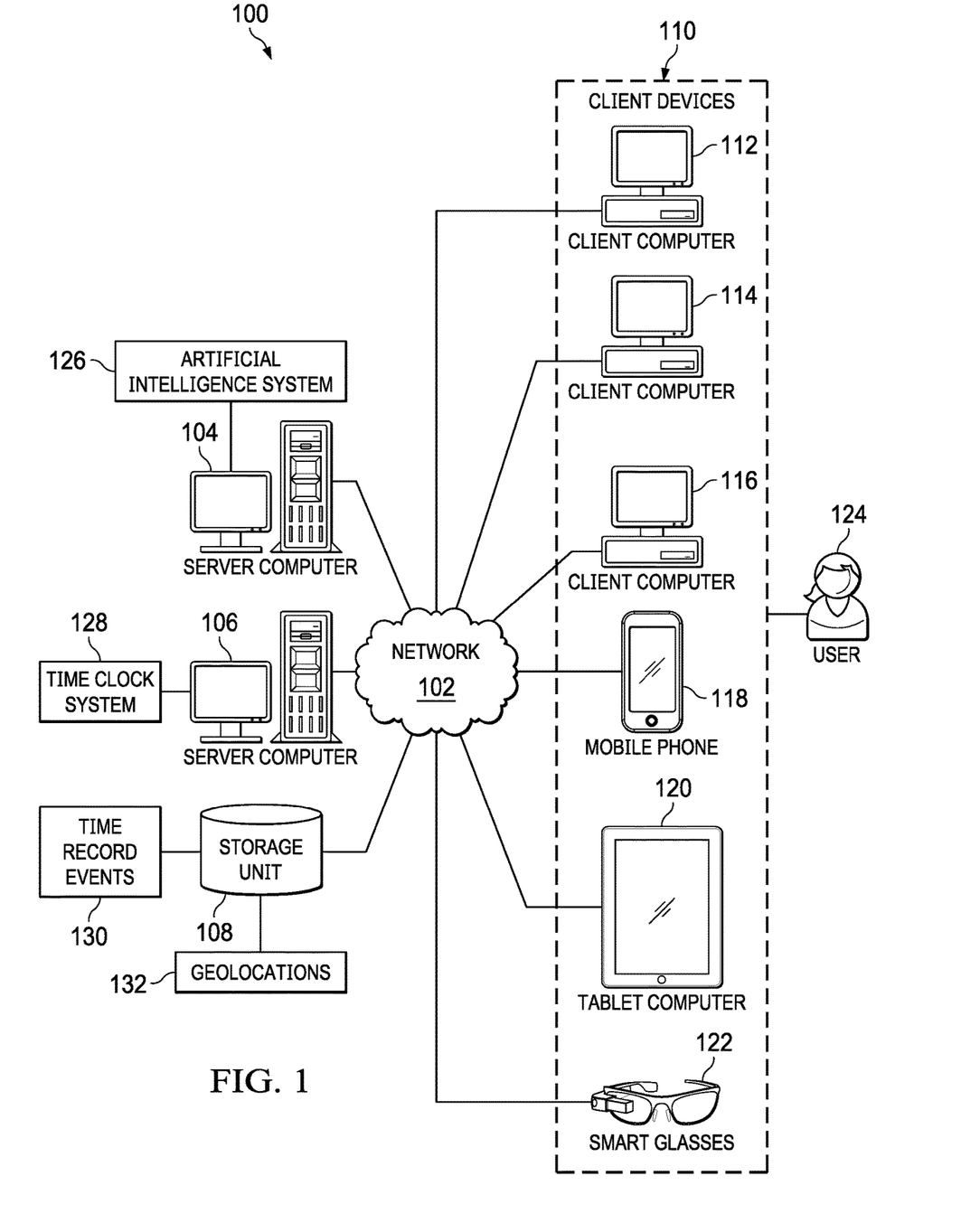
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in Network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "a set of" or "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, artificial intelligence system 126 collects time record events 130 for a number of users, such as user 124. Time record events 130 are a historical collection of clock in and clock out operations performed by user 124 using time clock system 128. Time record events 130 can be stored on storage unit 108.

In this illustrative example, artificial intelligence system 126 collects geolocations 132 for user 124 for each of time record events 130. Geolocations 132 may be ascertained using positioning information, such as global positioning system (GPS) coordinate information, received from a GPS receiver in one or more client devices 110. Geolocations 132 may be recorded by time clock system 128 in conjunction with time record events 130.

Artificial intelligence system 126 uses the historical clock in/out data, employee geolocation and feedback inputs from manual intervention to learn the employee behavior related with the times when he is used to clock in or clock out in his work shift and locations. In this illustrative example, artificial intelligence system 126 simultaneously models the time record events 130 and geolocations 132 for each of the number of users. Artificial intelligence system 126 can model the time record events 130 and geolocations 132 via multimodal multi-task learning.

According to the modeling, Artificial intelligence system 126 can predict a timing of clock-in and clock-out operations, and push a suggestion to user 124 at the time predicted by the modeling. When a current geolocation of user 124 matches the geolocation predicted by the modeling, artificial intelligence system 126 can automatically provide push notifications of clock in/out suggestions via one or more of email and mobile phone, which the user can approve or correct.

Artificial intelligence system 126 operating in conjunction with time clock system 128 overcomes a technical problem of quickly and easily recording time record events in a manner that can save employees time and keep them focused on real valuable activities. In one illustrative example, artificial intelligence system 126 operating in conjunction with time clock system 128 solves the technical problem of the adverse impact high-volume clock in and clock out operations has on network infrastructure during peak hours.

Figure 2:
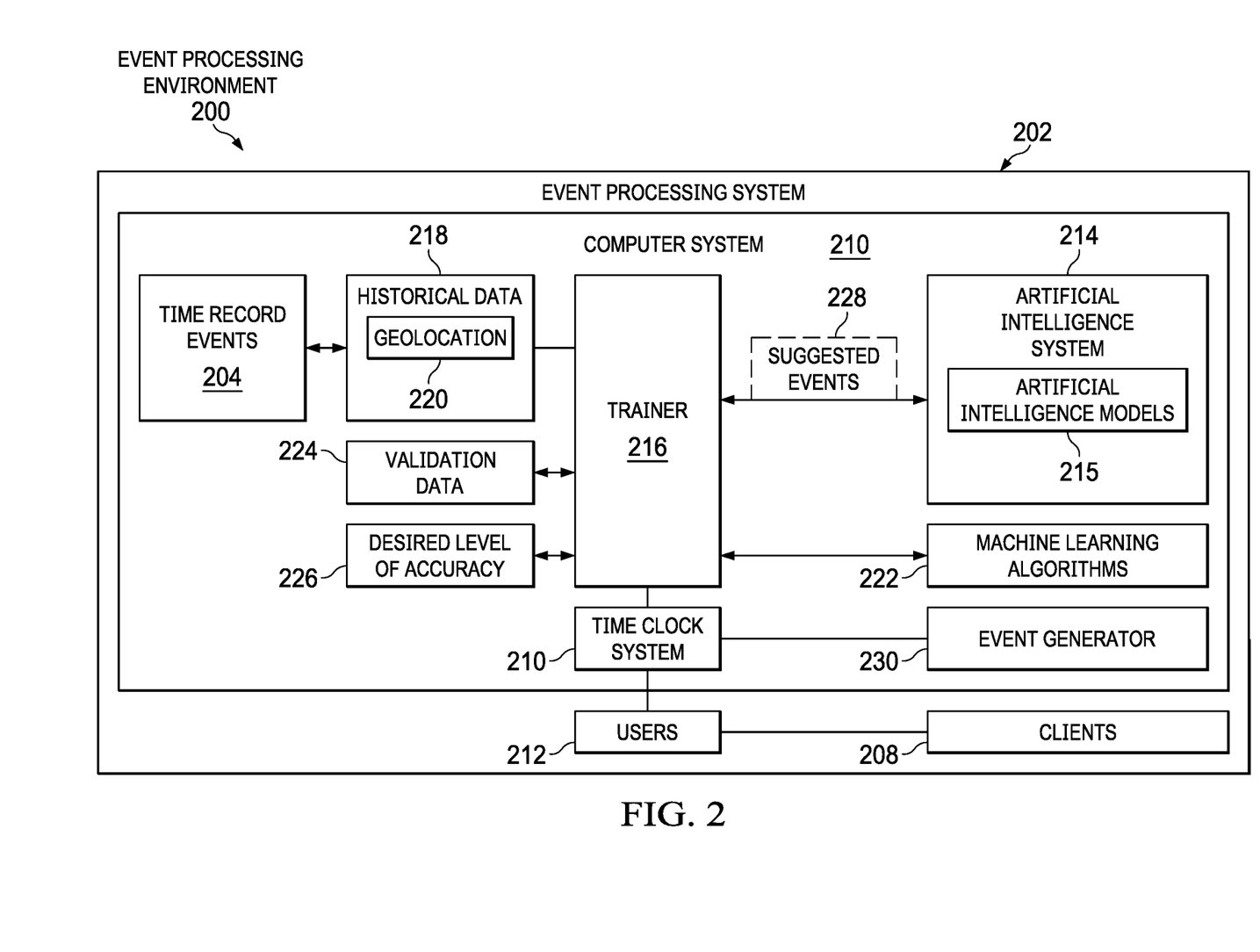
FIG. 2 is a block diagram of an event processing environment is depicted in accordance with an illustrative embodiment.

With reference now to FIG. 2, a block diagram of an event processing environment is depicted in accordance with an illustrative embodiment. In this illustrative example, event processing environment 200 includes components that can be implemented in hardware such as the hardware shown in network data processing system 100 in FIG. 1.

In this illustrative example, event processing system 202 operates to process time record events 204 using artificial intelligence system 214 for clients 208. Clients 208 can be selected from at least one of an organization, a company, an individual, a partnership, a charity, a city, or some other suitable type of client. As depicted, time record events 204 can be generated by time clock system 211 when users 212 perform a clock in or clock out operation.

In this illustrative example, artificial intelligence system 214 can be used to more efficiently process time record events 204 as compared to using a manual time clock system.

An artificial intelligence system is a system that has intelligent behavior and can be based on function of the human brain. An artificial intelligence system comprises at least one of an artificial neural network, and artificial neural network with natural language processing, a cognitive system, a Bayesian network, a fuzzy logic, an expert system, a natural language system, a cognitive system, or some other suitable system.

Machine learning is used to train the artificial intelligence system. Machine learning involves inputting data to the process and allowing the process to adjust and improve the function of the artificial intelligence system.

A cognitive system is a computing system that mimics the function of a human brain. The cognitive system can be, for example, IBM Watson available from International Business Machines Corporation.

In this illustrative example, artificial intelligence system 214 is located in computer system 210 and comprises a set of artificial intelligence models 215. When trained, each of these artificial intelligence models be used to process time record events 204.

Computer system 210 is a physical hardware system and includes one or more data processing systems. When more than one data processing system is present in computer system 210, those data processing systems are in communication with each other using a communications medium. The communications medium may be a network. The data processing systems may be selected from at least one of a computer, a server computer, a tablet, or some other suitable data processing system.

As depicted, trainer 216 in artificial intelligence system 214 in computer system 210 operates to train artificial intelligence system 214 for use in processing time record events 204. In other words, artificial intelligence system 214 trains one or more of artificial intelligence models 215.

Trainer 216 can be implemented in software, hardware, firmware or a combination thereof. When software is used, the operations performed by trainer 216 can be implemented in program code configured to run on hardware, such as a processor unit. When firmware is used, the operations performed by trainer 216 can be implemented in program code and data and stored in persistent memory to run on a processor unit. When hardware is employed, the hardware may include circuits that operate to perform the operations in trainer 216.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As depicted, trainer 216 identifies historical data 218. In this illustrative example, historical data 218 is generated from previous processing of time record events 204. In this illustrative example, historical data 218 include a record of a user's geolocation 220 during the time record events 204.

Trainer 216 trains artificial intelligence system 214 using historical data 218. As depicted, the training is performed using a set of machine learning algorithms 222. In this illustrative example, trainer 216 can validate training performed on artificial intelligence system 214 using validation data 224. Trainer 216 analyzes the process and results of validation data 224 to determine whether artificial intelligence system 214 performs with a desired level of accuracy 226.

Trainer 216 trains artificial intelligence system 214 using a first machine learning algorithm in the set of machine learning algorithms 222. Responsive to desired level of accuracy 226 being absent, trainer 216 performs additional training of artificial intelligence system 214 using historical data 218 and a second machine learning algorithm in the set of machine learning algorithms 222.

After training of artificial intelligence models 215, suggested events 228 can be generated for users 212 using artificial intelligence system 214 after artificial intelligence system 214 has been trained using historical data 218. For example, one or more of artificial intelligence models 215 can be selected for use in processing suggested events 228.

As depicted, event generator 230 can generate suggested events 228 for users 212, and communicate those events to time clock system 211. As depicted, suggested events 228 are generated by event generator 230 based on a current geolocation of users 212.

In these illustrative examples, artificial intelligence models 215 can continue to be trained incrementally over time to learn when to generate suggested events 228. For example, user feedback from suggested events 228 can be incorporated into historical data 218. As a result, machine training can increase the ability of artificial intelligence models 215 to accurately and efficiently generate new suggested events 228.

In one illustrative example, one or more technical solutions are present that overcome a technical problem with quickly and easily recording time record events in a manner that can save employees time and keep them focused on real valuable activities. As a result, artificial intelligence system 126 operating in conjunction with time clock system 211 provides a technical solution to the adverse impact high-volume clock in and clock out operations has on network infrastructure during peak hours.

Computer system 210 can be configured to perform at least one of the steps, operations, or actions described in the different illustrative examples using software, hardware, firmware or a combination thereof. As a result, computer system 210 operates as a special purpose computer system in which trainer 216 in computer system 210 enables training an artificial intelligence system 214 to generate time record events 204. In particular, trainer 216 transforms computer system 210 into a special purpose computer system as compared to currently available general computer systems that do not have trainer 216.

In the illustrative example, the use of trainer 216 in computer system 210 integrates processes into a practical application for a method of training an artificial intelligence system 214 that increases the performance of computer system 210. In other words, trainer 216 in computer system 210 is directed towards a practical application of processes integrated into trainer 216 in computer system 210 that identifies historical data 218 from previously processed time record events 204.

In this illustrative example, trainer 216 in computer system 210 utilizes annotations to train an artificial intelligence system 214 using one or more machine learning algorithms 222 in a manner that that results in an artificial intelligence system 214 that is capable of processing time record events 204 with a desired level of accuracy 226. In this manner, trainer 216 in computer system 210 provides a practical application of a method for training an artificial intelligence system to process time record events such that the functioning of computer system 210 is improved when using the trained artificial intelligence system.

Figure 3:
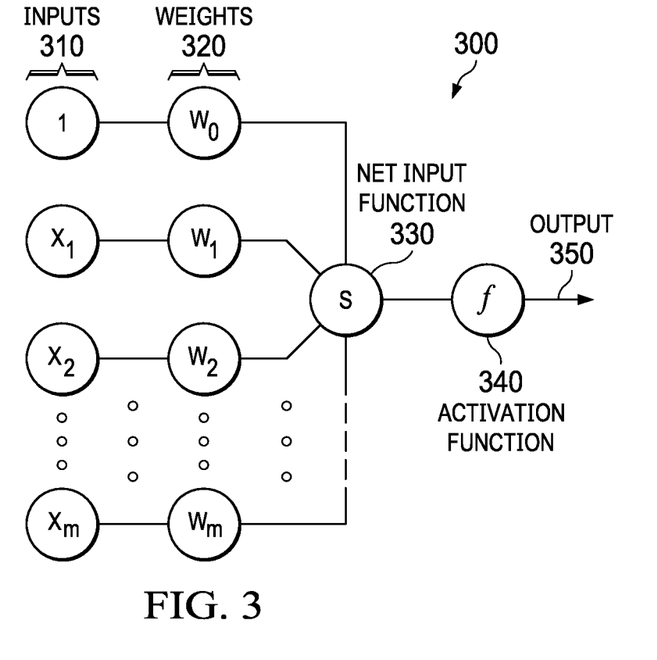
FIG. 3 is a diagram that illustrates a node in a neural network in which illustrative embodiments can be implemented.

FIG. 3 is a diagram that illustrates a node in a neural network in which illustrative embodiments can be implemented. Node 300 might comprise part of artificial intelligence system 214 in FIG. 2. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Figure 4:
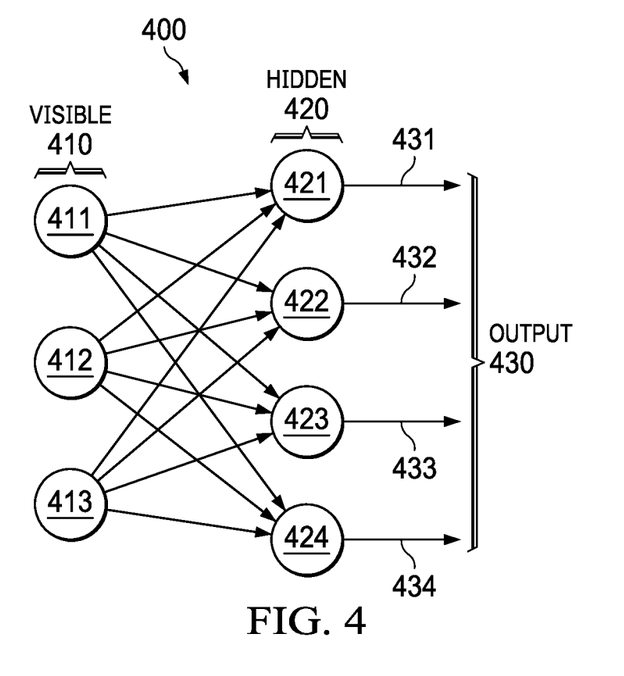
FIG. 4 is a diagram illustrating a neural network in which illustrative embodiments can be implemented.

FIG. 4 is a diagram illustrating a neural network in which illustrative embodiments can be implemented. Neural network 400 might comprise part of artificial intelligence system 214 in FIG. 2 and is comprised of a number of nodes, such as node 300 in FIG. 3. As shown in FIG. 4, the nodes in the neural network 400 are divided into a visible input layer 410, one or more hidden layers 420, and an output layer 430. Neural network 400 is an example of a fully connected neural network (FCNN) in which each node in a layer is connect to all of the nodes in an adjacent layer, but nodes within the same layer share no connections.

The nodes in visible input layer 410 are those that receive information from the environment (i.e. a set of external training data). Each node in visible input layer 410 takes a low-level feature from an item in the dataset and passes it to the nodes in the hidden layer 420. When a node in the hidden layer 420 receives an input value x from a visible node in visible input layer 410 it multiplies x by the weight assigned to that connection (edge) and adds it to a bias b. The result of these two operations is then fed into an activation function which produces the node's output.

For example, when hidden node 421 receives input from all of the visible nodes 411-413 each x value from the separate nodes is multiplied by its respective weight, and all of the products are summed. The summed products are then added to the hidden layer bias, and the result is passed through the activation function to produce output 431. A similar process is repeated at hidden nodes 422-424 to produce respective outputs 432-434. In the case of a deeper neural network, the collective outputs of hidden layer 420 serve as inputs to the next hidden layer, or to output layer 430.

The output layer 430 is used to output density parameters, or "logits". For example, the mean and variance for the Gaussian distribution. Usually, the FCNN is used to produce classification labels or regression values. However, the illustrative embodiments use it directly to produce the distribution parameters, which can be used to estimate the likelihood/probability of output events/time.

Training a neural network is conducted with standard mini-batch stochastic gradient descent-based approaches, where the gradient is calculated with the standard back-propagation procedure. In addition to the neural network parameters, which need to be optimized during the learning procedure, there are the weights for different distributions, which also need to be optimized based on the underlying dataset.

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Neural networks can be stacked to create deep networks. After training one neural net, the activities of its hidden nodes can be used as input training data for a higher level, thereby allowing stacking of neural networks. Such stacking makes it possible to efficiently train several layers of hidden nodes.

A recurrent neural network (RNN) is a type of deep neural network in which the nodes are formed along a temporal sequence. RNNs exhibit temporal dynamic behavior, meaning they model behavior that varies over time.

Figure 5:
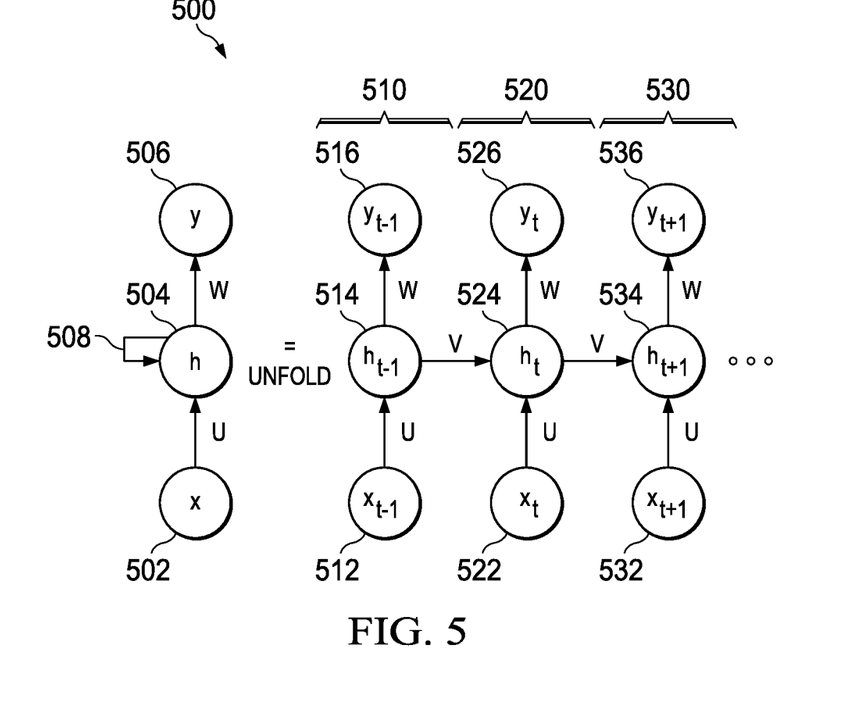
FIG. 5 illustrates an example of a recurrent neural network in which illustrative embodiments can be implemented.

FIG. 5 illustrates an example of a recurrent neural network in which illustrative embodiments can be implemented. RNN 500 might comprise part of artificial intelligence system 214 in FIG. 2. RNNs are recurrent because they perform the same task for every element of a sequence, with the output being depended on the previous computations. RNNs can be thought of as multiple copies of the same network, in which each copy passes a message to a successor. Whereas traditional neural networks process inputs independently, starting from scratch with each new input, RNNs persistence information from a previous input that informs processing of the next input in a sequence.

RNN 500 comprises an input vector 502, a hidden layer 504, and an output vector 506. RNN 500 also comprises loop 508 that allows information to persist from one input vector to the next. RNN 500 can be "unfolded" (or "unrolled") into a chain of layers, e.g., 510, 520, 530 to write out the network 102 for a complete sequence. Unlike a traditional neural network, which uses different weights at each layer, RNN 500 shares the same weights U, W, V across all steps. By providing the same weights and biases to all the layers 510, 520, 530, RNN 500 converts the independent activations into dependent activations.

The input vector 512 at time step t−1 is $x_{t-1}$. The hidden state $h_{t-1}$ 514 at time step t−1, which is required to calculate the first hidden state, is typically initialized to all zeroes. The output vector 516 at time step t−1 is $y_{t-1}$. Because of persistence in the network, at the next time step t, the state $h_t$ of the hidden state $h_t$ 524 is calculated based on the previous hidden state $h_{t-1}$ 514 and the new input vector $x_t$ 522. The hidden state $h_t$ acts as the "memory" of the network. Therefore, output $y_t$ 526 at time step t depends on the calculation at time step t−1. Similarly, output $y_{t+1}$ 536 at time step t+1 depends on hidden state $h_{t+1}$ 534, calculated from hidden state $h_t$ 524 and input vector $x_{t+1}$ 532.

There are several variants of RNNs such as "vanilla" RNNs, Long Short-Term Memory (LSTM), Gated Recurrent Unit (GRU), and others with which the illustrative embodiments can be implemented.

By employing an RNN, the illustrative embodiments are able to model changes in geolocation and event timing for time record events based on user activity over time.

Figure 6:
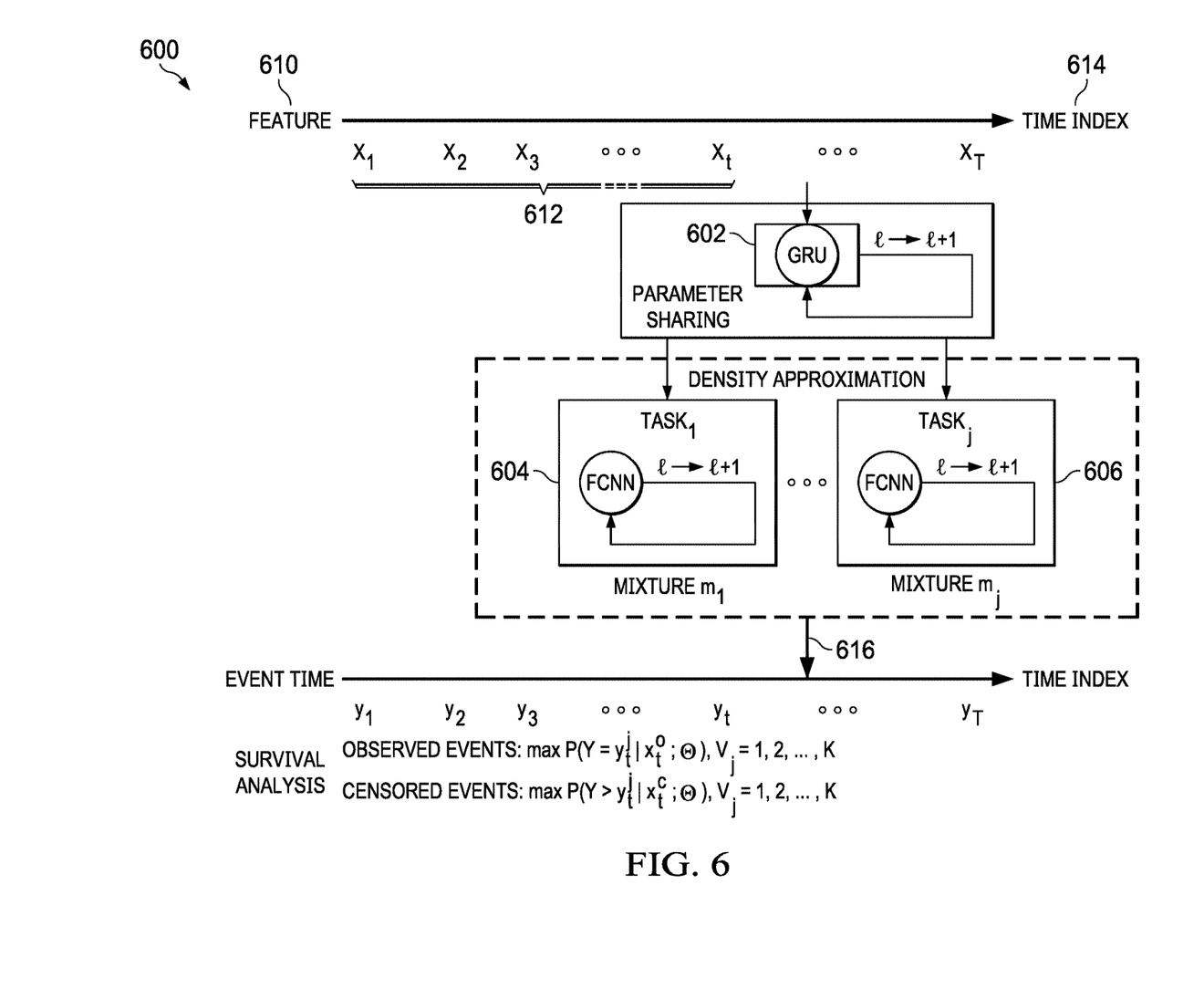
FIG. 6 depicts a multimodal, multi-task deep learning architecture in accordance with illustrative embodiments.

FIG. 6 depicts a multimodal, multi-task deep learning architecture in accordance with illustrative embodiments. Deep learning architecture 600 can be implemented through a combination of RNN 500 in FIG. 5 and neural network 400 in FIG. 4. Deep learning architecture 600 might be an example implementation of artificial intelligence system 214 in FIG. 2.

In this illustrative example, deep learning architecture 600 comprises RNN 500 and one or more FCNN layer groups 604. As depicted, one or more FCNN layer groups 604 includes FCNN layer groups 604 and 606. By using multiple FCNN layer croups 604 and 606 on top of the GRU 602 layers, deep learning architecture 600 can approximate the density (distribution) of event time. In particular, RNN 500 outputs the density parameters (e.g., mean and variance for the Gaussian distribution, or scale and shape parameters for the Weibull distribution). One simple distribution might not fit the underlying data very well. Therefore, illustrative embodiments can use a weighted combination of basis distributions to form the final output distribution. For the combination method, the illustrative embodiments can use the arithmetic average or geometric average. Once the density parameters are induced/outputted, the probability or density function for any given time can be computed, which is how the labeled sequence is used to compute the likelihood (or losses) to do backpropagation.

Machine learning can be used to forecast changes to time record events. Such time record events might comprise a clock in event, or a clock out event. In addition to classifying predicted changes over the different categories, the multi-task learning can address the problem of forecasting the normalized time-to-event of the next time record event. Based on the prediction/monitoring frequency, the illustrative embodiments can predict if a customer is going to make a time record event in $I_d$, and the corresponding time based on the user's activities up to this day, along with certain static attributes.

Input into deep learning architecture 600 comprises dynamic feature values 610 extracted at different time stamps $x_1, x_2, x_3, x_t$ 612 along a time index 614. The time intervals between timestamps 612 might be daily, weekly, monthly, etc. For each user, at each of timestamps 612, the output produced by GRU 602 is a vector containing different elements, one for clock in events, and one for clock out events.

The whole dataset used by GRU 602 can represent events across all users within a time period. Each output only indicates a predicted change for a particular customer based on the observed data. However, prediction and inference of future change for a given user can rely both on past behavior of that customer as well as change behavior of similar users (defined by shared static features). Therefore, the prediction output can be an intelligent decision encoded with all changes across all events in the dataset.

In an illustrative embodiment, GRU 602 might comprise three layers (not shown). However, more layers can be used if needed. Each layer feeds into the next, denoted l→l+1 in FIG. 6. Within each GRU layer, the output of the previous timestamp is used as input for the next timestamp in the temporal sequence.

In one illustrative example, deep learning architecture 600 can comprise, but does not necessarily require, a separate FCNN layer group for each type of predicted time record event. Therefore, there are FCNN layer groups 604 and 606, one for each type of time record event. Each FCNN might comprise multiple fully connected layers, as shown for example in FIG. 4.

GRU 602 shares all predicted time record events to learn common representation. A density/distribution modeling/approximation can be attached to FCNN groups 604 and 606. For example, FCNN 604 might compute the density approximation for a clock-in event. Similarly, FCNN 606 might approximate density for a clock-out event. Specifically, density will output the density parameter(s). Using a clock-in event as an example, assuming the output time sequence from GRU 602 follows the normal distribution, which has a mean parameter and a variance parameter, FCNN 604 can compute any probability density/distribution function or likelihood given any test time.

The final output vector 616 may comprise a mixture of multiple distributions to determine the event prediction. In addition to a normal distribution there might also be Weibull distribution, an exponential distribution, etc. These probability density functions are combined together to produce one final weighted average. Each distribution will have a weight, which is determined automatically during the learning stage. The weighting is for each event type. Using the example above, for FCNN 604 there will be multiple distributions attached with different weights. For FCNN 606, there will be a similar kind of mixture behavior.

Figure 7:
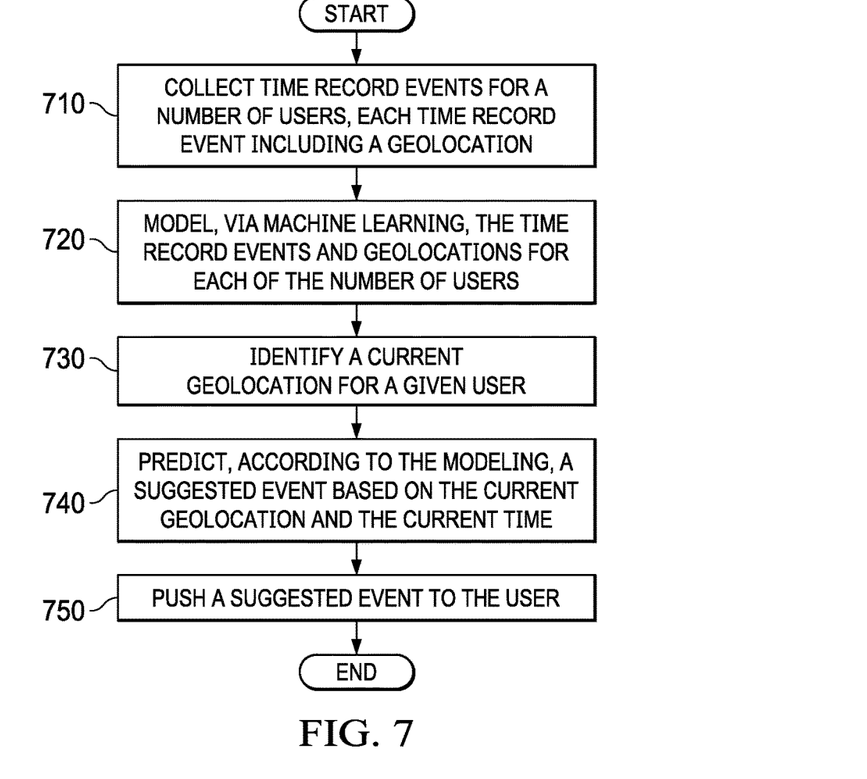
FIG. 7 is a flowchart illustrating a process for managing time record events in accordance with an illustrative embodiment.

FIG. 7 depicts a flowchart illustrating a process for managing time record events in accordance with an illustrative embodiment. The process of FIG. 7 can be implemented in one or more components of computer system 210 of FIG. 2.

The process begins by collecting time record events for a number of users (step 710). Each time record event includes a geolocation of one of a number of users. The process models the time record events and geolocations for each of the number of users (step 720).

The process identifies a current geolocation for a given user during the timing predicted by the modeling (step 730). The current geolocation can be identified by receiving location coordinates from a suitably enabled device, such as one or more of client devices 110 of FIG. 1.

The process predicts, according to the modeling, a suggested event based on the current geolocation and current time (step 740). The process pushes a suggested event to the user (step 750), and terminates thereafter. The suggested event can be pushed to the user using any suitable communication protocol, such as for example but not limited to, one or more of email and short messaging system (SMS).

Figure 8:
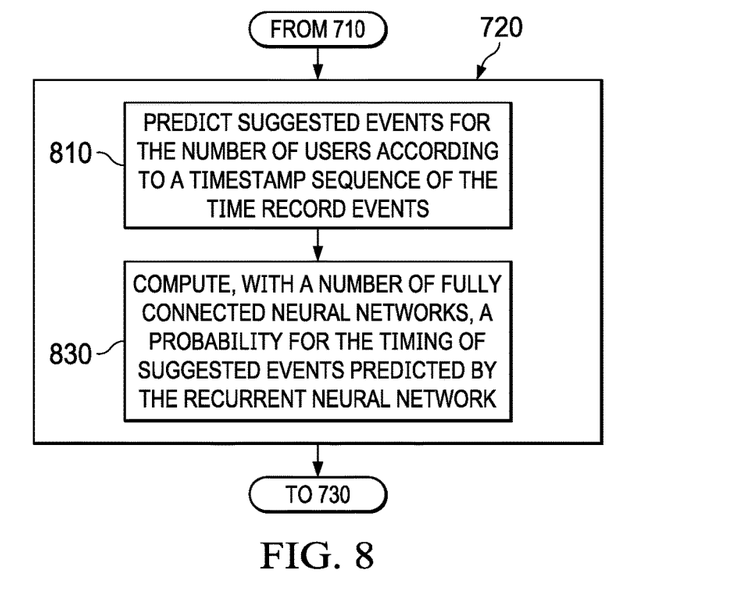
FIG. 8 is a flowchart illustrating a process for modeling time record events and geolocations is depicted according to an illustrative embodiment.

With reference next to FIG. 8, a process for modeling time record events and geolocations is depicted according to an illustrative embodiment. The process of FIG. 8 is one example in which processing steps of block 720 of FIG. 7 can be performed.

Continuing from step 710 of FIG. 7, the process predicts suggested events for the number of users according to a timestamp sequence of the time record events (step 810). Using a number of fully connected neural networks, the process computes a probability for the timing of suggested events (step 820). The process continues to step 730 of FIG. 7 thereafter. In step 820, a separate fully connected neural network can calculate the probability for the timing of the suggested events.

Figure 9:
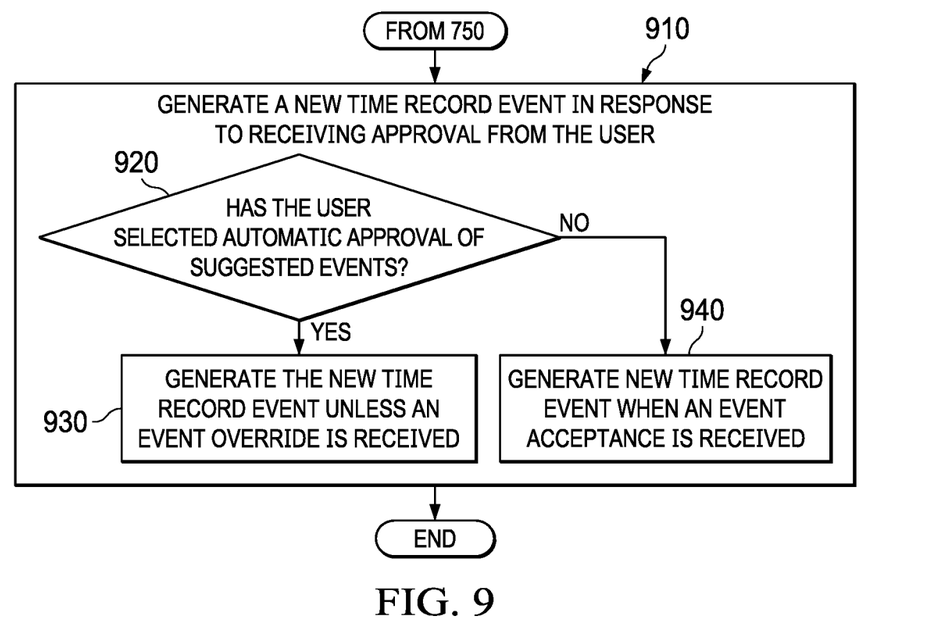
FIG. 9 is a flowchart illustrating a process for generating a time record event is depicted according to an illustrative embodiment.

With reference next to FIG. 9, a process for generating a time record event is depicted according to an illustrative embodiment. The process of FIG. 9 can be implemented in one or more components of computer system 210 of FIG. 2, and performed in conjunction with the process of FIG. 7.

Continuing from step 760 of FIG. 7, the process generates a new time record event in response to receiving approval from the user (step 910), and terminates thereafter. In this illustrative example, step 910 can include determining whether the user has selected automatic approval of suggested events (step 920).

In response to determining that the user has selected automatic approval of suggested events ("yes" at step 920), the process generates the new time record event unless an event override is received from the user (step 930). Step 930 is one example of one mode example in which event processing system 202 can operate. In this mode, the inferred clock suggestion becomes automatically effective unless the user manually correct it via current process. This manual input will be used as historical data 218 to improve artificial intelligence models 215 and provide better inferences in the future.

In response to determining that the user has not selected automatic approval of suggested events ("no" at step 920), the process generating the new time record event when an event acceptance is received from the user (step 940). Step 940 is another example of one mode example in which event processing system 202 can operate. In this mode, the user needs to explicitly accept the proposed clock suggestion for it to become effective in the system. If the proposed suggestion needs to be corrected, the user can instead generate a time clock event using a known manual process. The manual input will be used as historical data 218 to adapt artificial intelligence models 215 and provide better inferences and the future. Additional notifications can be sent at later times to prevent the user of forgetting to accept the proposed time.

Figure 10:
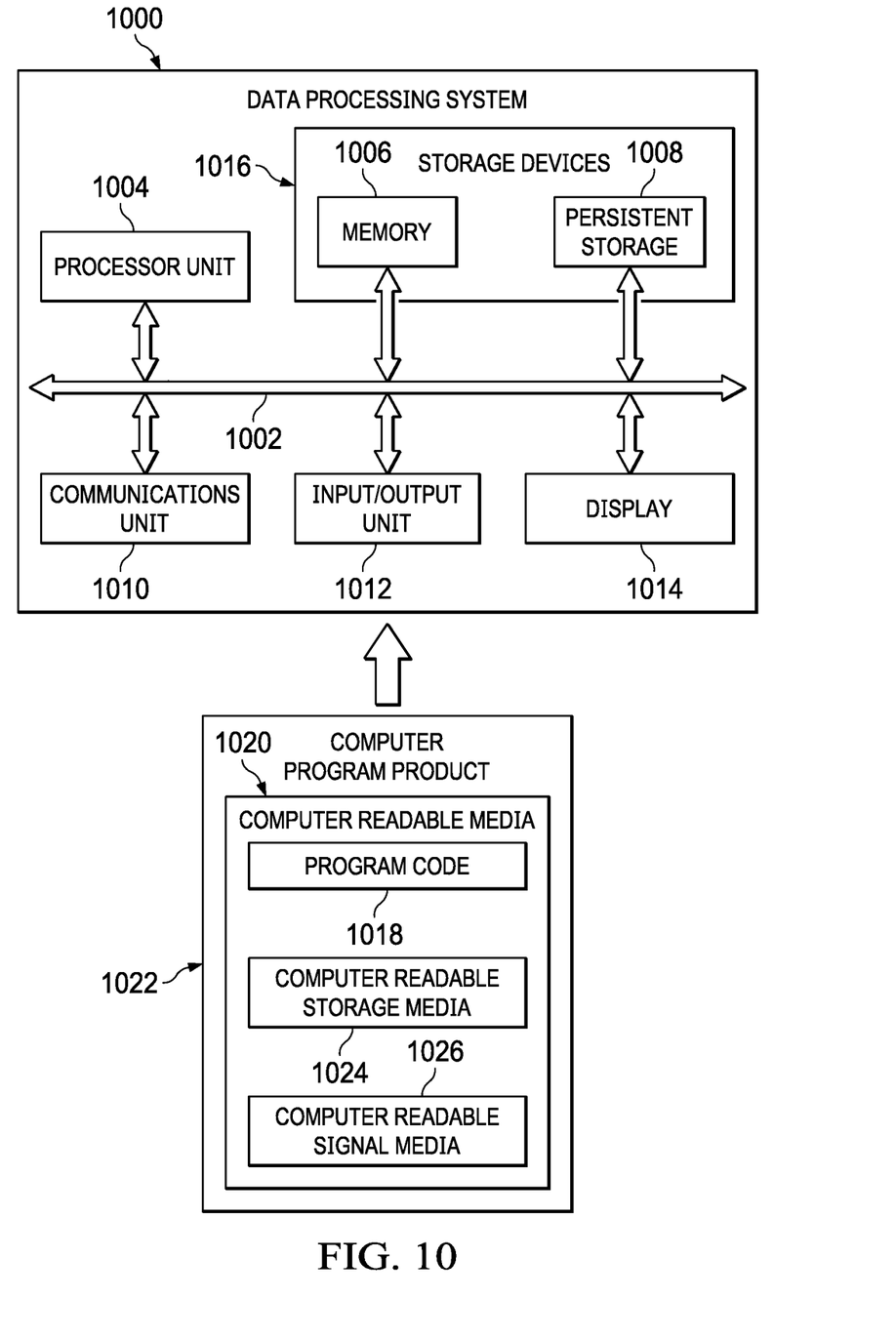
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement one or more computers, including and client devices 110 and server computers 104 and 106 in FIG. 1, as well as computer system 210 of FIG. 2. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). In an alternate embodiment, processor unit 1004 comprises one or more graphical processing units (CPUs).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Alternatively, program code 1018 may be transferred to data processing system 1000 using computer-readable signal media 1026.

Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Illustrative embodiments provide a provides a computer-implemented method for recording time record events. Time record events are collected for a number of users. Each time record event includes a geolocation of one of a number of users. The time record events in geolocations for each of the number of users are simultaneously modeling via multi-modal multi-task learning. A timing of suggested events and suggested geolocation are predicted according the modeling. A current geolocation for a given user is identified during the timing predicted by the modeling. If the current geolocation matches the suggested geolocation predicted by the modeling, a suggested event is pushed to the user.

The illustrative embodiments overcome a technical problem of quickly and easily recording time record events in a manner that can save employees time and keep them focused on real valuable activities. The illustrative embodiments solve the technical problem of the adverse impact high-volume clock in and clock out operations has on network infrastructure during peak hours.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for recording time record events, the method comprising:
    collecting, by a number of processors, time record events for a number of users, each time record event including a geolocation of one of the number of users;
    training, by the number of processors using a first machine learning algorithm, a machine learning model based on historical data generated from processing of previous time record events and annotations of the historical data;
    validating, by the number of processors, the training on the machine learning model to determine whether the machine learning model performs with a desired level of accuracy;
    in response to the desired level of accuracy being absent, performing additional training, by the number of processor using a second machine learning algorithm, on the machine learning model;
    modeling, by the number of processors via the machine learning model, the time record events and geolocations for each of the number of users;
    identifying, by the number of processors, a current geolocation for a given user;
    predicting, by the number of processors according to the modeling, a suggested event based on the current geolocation and a current time, wherein the suggested event is a clock-in event or a clock-out event;
    pushing, by the number of processors, the suggested event to the given user;
    soliciting, by the number of processors, user feedback of the suggested event from the given user, wherein the user feedback comprises feedbacks regarding accuracy of the suggested event;
    incorporating, by the number of processors, the user feedback into the historical data; and
    retraining, by the number of processors, the machine learning model based on the historical data incorporated with the user feedback.

2. The method of claim 1, wherein modeling the time record events and the geolocations comprises:
    predicting, with a recurrent neural network, suggested events for the number of users according to a timestamp sequence of time record events;
    computing, with a number of fully connected neural networks, a probability for a timing of the suggested events predicted by the recurrent neural network, wherein the probability is a weighted combination of several basis distributions from different approximation methods.

3. The method of claim 2, wherein a separate fully connected neural network calculates the probability for the timing of the suggested events.

4. The method of claim 1, wherein a time record event comprises one of:
    Clock-in; or
    Clock-out.

5. The method of claim 1, further comprising:
    generating a new time record event in response to receiving an approval from the given user.

6. The method of claim 5, wherein generating the new time record event further comprises:
    determining whether the given user has selected automatic approval of the suggested event; and
    in response to determining that the given user has selected automatic approval, generating the new time record event unless an event override is received from the given user.

7. The method of claim 5, wherein generating the new time record event further comprises:
    determining whether the given user has selected automatic approval of the suggested event; and
    in response to determining that the given user has not selected automatic approval, generating the new time record event when an event acceptance is received from the given user.

8. A system for recording time record events, the system comprising:
    a bus system;
    a storage device connected to the bus system, wherein the storage device stores program instructions; and
    a number of processors connected to the bus system, wherein the number of processors execute the program instructions to:
        collect time record events for a number of users, each time record event including a geolocation of one of the number of users;
        train a machine learning model based on historical data generated from processing of previous time record events and annotations of the historical data using a first machine learning algorithm;
        validate the training on the machine learning model to determine whether the machine learning model performs with a desired level of accuracy;
        in response to the desired level of accuracy being absent, perform additional training, using a second machine learning algorithm, on the machine learning model;
        model, via machine learning, the time record events and geolocations for each of the number of users;
        identify a current geolocation for a given user;
        predict, according to the modeling, a suggested event based on the current geolocation and a current time, wherein the suggested event is a clock-in event or a clock-out event;
        push the suggested event to the given user;

solicit, user feedback of the suggested event from the given user, wherein the user feedback comprises feedbacks regarding accuracy of the suggested event;

incorporate, the user feedback into the historical data; and retrain, the machine learning model based on the historical data incorporated with the user feedback.

9. The system of claim 8, wherein in modeling the time record events and the geolocations, the number of processors further execute the program instructions to:

predict, with a recurrent neural network, suggested events for the number of users according to a timestamp sequence of time record events; and compute, with a number of fully connected neural networks, a probability for a timing of the suggested events predicted by the recurrent neural network, wherein the probability is a weighted combination of several basis distributions from different approximation methods.

10. The system of claim 9, wherein a separate fully connected neural network calculates the probability for the timing of the suggested events.

11. The system of claim 8, wherein a time record event comprises one of:

Clock-in; or

Clock-out.

12. The system of claim 8, wherein the number of processors further execute the program instructions to:

generate a new time record event in response to receiving an approval from the given user.

13. The system of claim 12, wherein in generating the new time record event, the number of processors further execute the program instructions:

determine whether the given user has selected automatic approval of the suggested event; and generate the new time record event unless an event override is received from the given user in response to determining that the given user has selected automatic approval.

14. The system of claim 12, wherein in generating the new time record event, the number of processors further execute the program instructions to:

determine whether the given user has selected automatic approval of the suggested event; and generate the new time record event when an event acceptance is received from the given user in response to determining that the given user has not selected automatic approval.

15. A computer program product for recording a time record event, the computer program product comprising:

a computer-readable storage media; and program code, stored on the computer-readable storage media, for collecting, by a number of processors, time record events for a number of users, each time record event including a geolocation of one of the number of users;

program code, stored on the computer-readable storage media, for training, by the number of processors using a first machine learning algorithm, a machine learning model based on historical data generated from processing of previous time record events and annotations of the historical data;

program code, stored on the computer-readable storage media, for validating, by the number of processors, the training on the machine learning model to determine whether the machine learning model performs with a desired level of accuracy;

program code, stored on the computer-readable storage media, in response to the desired level of accuracy being absent, for performing additional training, by the number of processor using a second machine learning algorithm, on the machine learning model;

program code, stored on the computer-readable storage media, for modeling, via machine learning, the time record events and geolocations for each of the number of users;

program code, stored on the computer-readable storage media, for identifying a current geolocation for a given user;

program code, stored on the computer-readable storage media, for predicting, according to the modeling, a suggested event based on the current geolocation and a current time, wherein the suggested event is a clock-in event or a clock-out event;

program code, stored on the computer-readable storage media, for pushing the suggested event to the given user;

program code, stored on the computer-readable storage media, for soliciting, by the number of processors, user feedback of the suggested event from the given user, wherein the user feedback comprises feedbacks regarding accuracy of the suggested event;

program code, stored on the computer-readable storage media, for incorporating, by the number of processors, user feedback into the historical data; and program code, stored on the computer-readable storage media, for retraining, by the number of processors, the machine learning model based on the historical data incorporated with the user feedback.

16. The computer program product of claim 15, wherein the program code for modeling the time record events and the geolocations comprises:

code for predicting suggested events for the number of users according to a timestamp sequence of time record events; and code for computing, with a number of fully connected neural networks, a probability for a timing of the suggested events predicted by a recurrent neural network, wherein the probability is a weighted combination of several basis distributions from different approximation methods.

17. The computer program product of claim 16, wherein a separate fully connected neural network calculates the probability for the timing of the suggested events.

18. The computer program product of claim 15, wherein a time record event comprises one of:

Clock-in; or

Clock-out.

19. The computer program product of claim 15, further comprising:

generating a new time record event in response to receiving an approval from the given user.

20. The computer program product of claim 19, wherein the program code for generating the new time record event further comprises:

code for determining whether the given user has selected automatic approval of the suggested event; and code for generating the new time record event unless an event override is received from the given user in response to determining that the given user has selected automatic approval.

21. The computer program product of claim 19, wherein the program code for generating the new time record event further comprises:
   code for determining whether the given user has selected automatic approval of the suggested event; and
   code for generating the new time record event when an event acceptance is received from the given user in response to determining that the given user has not selected automatic approval.

* * * * *